Nov. 18, 1930.　　　A. W. SIZER　　　1,782,322
MOLDING MACHINE
Filed Sept. 3, 1929　　2 Sheets-Sheet 1

INVENTOR
Albert W. Sizer,
BY
ATTORNEYS

Nov. 18, 1930.  A. W. SIZER  1,782,322
MOLDING MACHINE
Filed Sept. 3, 1929   2 Sheets-Sheet 2

INVENTOR
Albert W. Sizer,
BY
ATTORNEYS

Patented Nov. 18, 1930

1,782,322

UNITED STATES PATENT OFFICE

ALBERT WILLIAM SIZER, OF HESSLE, ENGLAND

MOLDING MACHINE

Application filed September 3, 1929. Serial No. 390,163.

The present invention relates to improvements in continuous molding machines of the type in which material is forced by means of a worm continuously through a die plate.

The object of the present invention is to provide a machine which will be capable of molding plastic material, such as mixtures of meals or crushed seeds into small pellets such as would be suitable for the feeding of poultry.

The manufacture of such small pellets has not hitherto been possible in continuous molding machines as with the ordinary type of worm this rapidly became packed with the material fed forward owing to the high pressure at the die plate, and rotated in the body of the molding machine without feeding.

According to the present invention, a worm for use in continuous molding machines is arranged with a shallow helical grove for the major part of its length arranged on the body of the feed worm, which body is of lesser diameter than the internal diameter of the molding chamber, and this shallow groove leads at the extreme end into a single feed worm convolution of a diameter equal to the internal diameter of the chamber, and extending down to a helical grove of similar diameter than the major length of the feed worm body having the shallow groove into which it runs.

The invention is more particularly described with reference to the accompanying drawings in which:—

Figure 1:
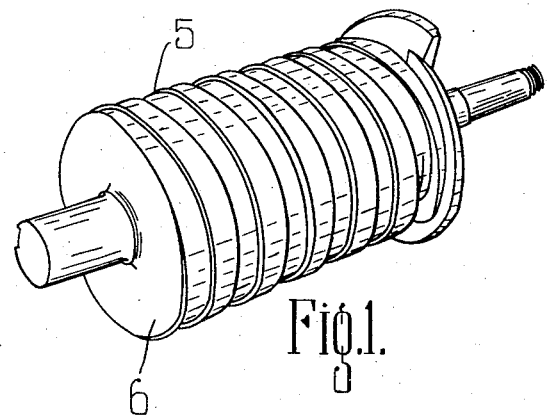
Figure 1 is a perspective view of a suitable form of feed worm according to the present invention.
Figure 2:
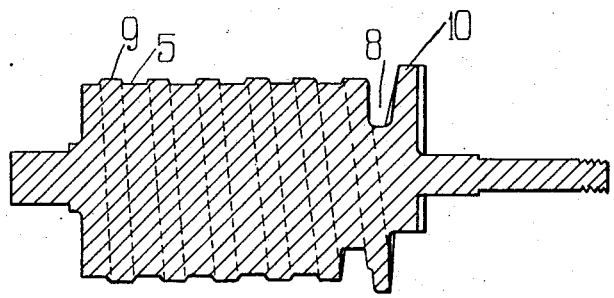
Figure 2 is a corresponding sectional elevation.
Figure 3:
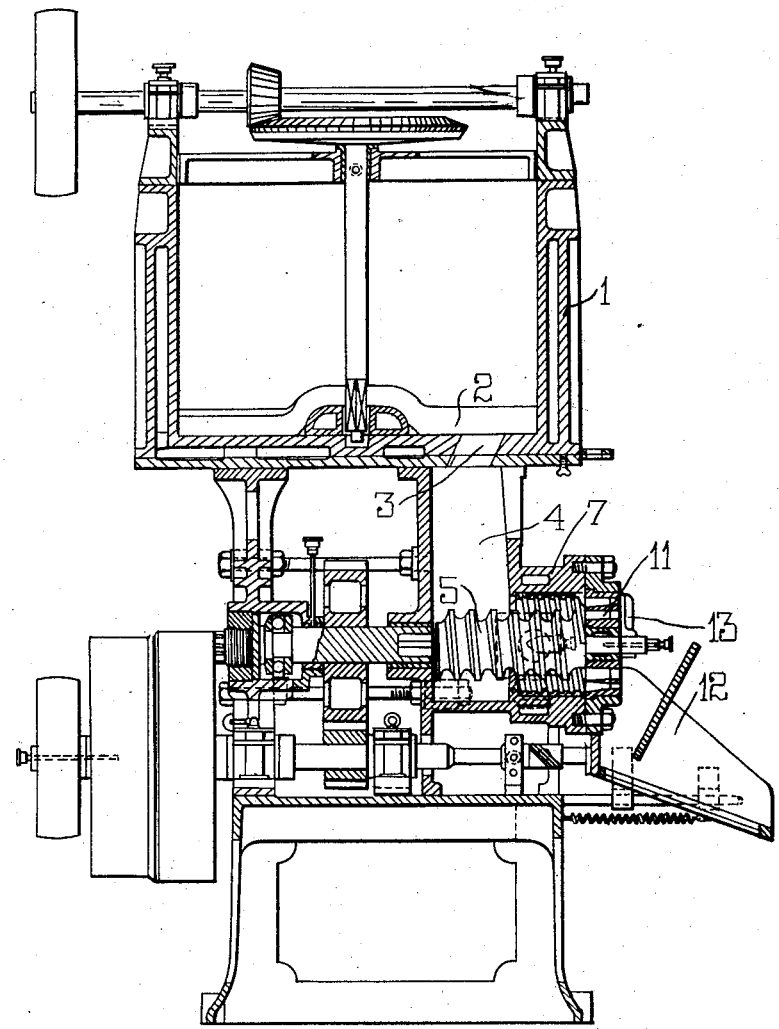
Figure 3 is a view of a complete machine.

Meal to be converted into pellets is passed from a jacketed chamber 1 by means of a scraper 2 through a port 3 into a feed opening 4, and in contradistinction to being fed forward by the lands or deep thread, an ordinary feed worm is fed forward by means of an extremely shallow groove 5 in the body 6 of a feed worm, this body 6 being for the major portion of its length of smaller diameter than the internal diameter of the compression chamber 7. This shallow groove 5 ultimately at the far end of the feed worm body 5 runs into a much deeper groove 8, which as will be seen from Figure 2, is of diameter roughly half the diameter of the shallow groove 5. From the main body of the feed worm similarly the thread 9 as distinct from the groove 5, runs into a worm or thread convolution 10, which is of greater diameter than the diameter of the shallow thread 9, and is of substantially the same external diameter as the internal diameter of the compression chamber 7. Pellets are extruded through the die plate 11, and are swept off into a chute 12 by means of a rotating knife 13.

I declare that what I claim is:—

A continuous molding machine for plastic material comprising in combination a compression chamber, a die plate closing said chamber, a feed worm body mounted to rotate within said chamber of lesser diameter than said chamber for the major proportion of its length, a shallow helical flange on said feed worm body merging at the delivery end into a flange of diameter equal to the internal diameter of said compression chamber.

In witness whereof, I have hereunto signed my name this 19th day of August 1929.

ALBERT WILLIAM SIZER.